(No Model.)

G. H. EDWARDS.
TRACTOR.

No. 425,662.  Patented Apr. 15, 1890.

Witnesses
W. Rossiter
A. Coates

Inventor
George H. Edwards
By Chas. G. Page
Atty.

UNITED STATES PATENT OFFICE.

GEORGE H. EDWARDS, OF CHICAGO, ILLINOIS.

TRACTOR.

SPECIFICATION forming part of Letters Patent No. 425,662, dated April 15, 1890.

Application filed July 11, 1889. Serial No. 317,242. (No model.)

*To all whom it may concern:*

Be it known that I, GEORGE H. EDWARDS, a citizen of the United States, residing at Chicago, in the county of Cook and State of Illinois, have invented a certain new and useful Improvement in Tractors, of which the following is a specification.

My invention relates to tractors involving an endless slatted belt or track which is provided along its inner side with a folding truss and arranged to pass about a set of truck-wheels, whereof one or more of the wheels are geared to the endless track and one or more of said wheels driven from an engine or other suitable motor, so that during operation the wheels may roll upon an endless track, which by reason of the jointed folding truss will throughout its lower leaf be rigid as against upward pressure, and hence provide a broad area of bearing-surface, which will lie upon the ground and sustain the weight, which will be distributed throughout said area of the lower leaf.

The object of my invention is to provide an improved construction of truss for an endless slatted track of the foregoing character, and to such end I provide, in connection with a set of slats hinged together in endless series, a truss comprising a set of strut-braces, which are secured to the slats, and a series of jointed chord-links, which are pivoted to the inner ends of the strut-braces. In connection with said chord-links I provide means, as hereinafter set forth, for throwing the sections of the jointed links from off dead-centers along such portions of the endless track as are brought to points where it is necessary for the truss to fold in order to permit the endless track to pass about the wheels.

Figure 1:
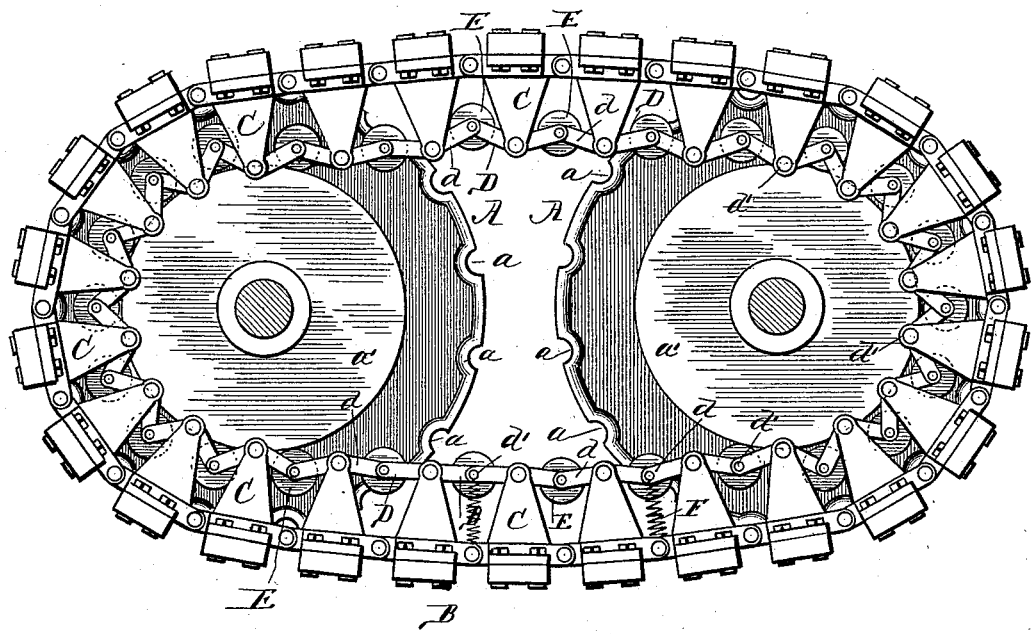
Figure 2:
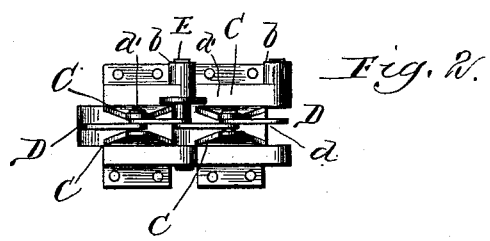
Figure 3:
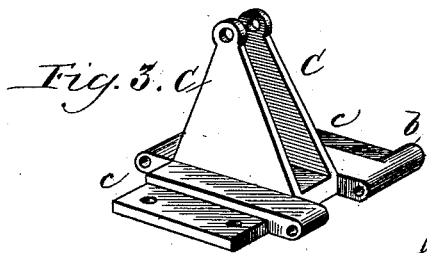

In the accompanying drawings, Figure 1 represents in side elevation a couple of wheels and an endless trussed track embodying my invention. Fig. 2 is a plan of a portion of the truss. Fig. 3 represents in perspective and on a larger scale a portion of the truss. Fig. 4 shows a portion of the truss with springs for throwing the link-sections from off dead-centers.

In said drawings, A indicates the wheels, and B denotes the endless slatted track. The wheels are provided with notches $a$, and the endless track is provided with teeth or lugs $b$, Fig. 2.

The strut-braces C are desirably arranged in pairs, the two braces of each pair being either formed in one piece or being formed separate from one another, as preferred. Each brace C is provided at its outer end with a laterally-formed ledge or flange $c$, which is bolted to a slat of the endless slatted track. The teeth or lugs $b$ can be formed with or secured upon the flanges or one series of braces, and said flanges are so formed at their ends that they can be hinged together in endless series, a convenient way of providing the flanges with pintle-bearings and so adapting them at their ends that they can interlock and be held together in endless series by pintle-bolts being illustrated in Fig. 3. By the foregoing arrangement the slats of the endless track are hinged together in endless series. Each pair of braces is connected with the next pair of braces by a jointed link D, so that the jointed links D will alternate with the pairs or couples of braces C, as in Figs. 1 and 2. The jointed links are pivoted to the inner ends of the braces and are each composed of a couple of sections $d$, connected together by joint-pins $d'$. Each joint-pin $d'$ preferably carries a small wheel or roller F, and each wheel A is rigid with a disk or annular shoulder $a'$, so that at the points where the endless track is about to pass about the wheels the engagement of the rollers E with the annular shoulders $a'$ will throw the jointed links from off dead-centers, and thereby permit the truss to fold, as fully shown in Fig. 1.

It will be seen that along the lower leaf of the belt which is between the two wheels A the sections of each or of many of the links are apt to be drawn into line by reason of the straightened-out condition of such portion of the track and that such position of the links might interfere with the free folding of the truss when such folding becomes necessary were it not for the rollers E and annular shoulders $a'$. In Fig. 4 I have shown springs F, which, while not so desirable, can evidently take the place of the rollers E and annular shoulders $a'$, it being understood that the springs, while permitting the links to straighten out along the lower leaf of the endless track, will at a point where the track is about to pass about a wheel cause the links to move off dead-centers, and thus allow the truss to fold in conformity with the curvature of the wheel. It is also understood that the endless track will desirably be provided with another like truss for the two remaining wheels of the truck, and that it is not herein necessary to illustrate such truck.

What I claim as my invention is—

1. The combination, with the wheels and an endless slatted track arranged to pass about said wheels, for the purpose set forth, of a jointed folding truss comprising a set of strut-braces secured to the slatted track and a set of jointed chord-links D, by which the inner ends of the strut-braces are connected together, substantially as described.

2. The combination, with an endless slatted track arranged to pass about said wheels, for the purpose set forth, of a jointed folding truss comprising a set of strut-braces secured to the slatted track, a set of jointed chord-links D, by which the inner ends of the braces are connected together, wheels about which the endless track is arranged to pass, and means, substantially as described, for throwing the jointed chord-links from off dead-centers.

3. The combination, with the wheels A and the annular shoulders, of the endless slatted track arranged to pass about said wheels and the truss comprising strut-braces secured to the slatted track, jointed links D, connecting the inner ends of the strut-braces together, and rollers carried by said links at their joints, substantially as and for the purpose described.

GEORGE H. EDWARDS.

Witnesses:
   CHAS. G. PAGE,
   A. COATES.